United States Patent
Nishimura et al.

(10) Patent No.: US 8,052,417 B2
(45) Date of Patent: Nov. 8, 2011

(54) MOLDING APPARATUS AND METHOD FOR MOLDING

(75) Inventors: Rikiya Nishimura, Nukata-gun (JP); Masaei Mitomi, Okazaki (JP); Hiroyuki Sato, Obu (JP)

(73) Assignee: Denso Corporation, Kariya (JP)

( * ) Notice: Subject to any disclaimer, the term of this patent is extended or adjusted under 35 U.S.C. 154(b) by 279 days.

(21) Appl. No.: 12/319,475

(22) Filed: Jan. 8, 2009

(65) Prior Publication Data

US 2009/0179351 A1 Jul. 16, 2009

(30) Foreign Application Priority Data

Jan. 11, 2008 (JP) ................................. 2008-004853

(51) Int. Cl.
 *B29C 45/33* (2006.01)
 *B29C 45/44* (2006.01)

(52) U.S. Cl. ...... 425/577; 425/441; 264/318; 264/328.1

(58) Field of Classification Search .............. 425/441, 425/442, 443, 577; 264/318; *B29C 45/36, B29C 45/44*
See application file for complete search history.

(56) References Cited

U.S. PATENT DOCUMENTS

| | | | | |
|---|---|---|---|---|
| 4,101,256 | A * | 7/1978 | White et al. | 425/441 |
| 5,879,611 | A * | 3/1999 | Takahashi et al. | 264/275 |
| 2006/0045933 | A1* | 3/2006 | Chen et al. | 425/438 |

FOREIGN PATENT DOCUMENTS

| | | |
|---|---|---|
| DE | 3628270 | 9/1987 |
| JP | 50-43583 | 12/1975 |
| JP | 61-50422 | 4/1986 |
| JP | 4-210862 | 7/1992 |
| JP | 06-114893 | 4/1994 |

OTHER PUBLICATIONS

Rosato, D.V., D.V. Rosato, and M.G. Rosato, Injection Molding Handbook, 3rd edition, 2000, pp. 323-325.*
Office Action dated Jan. 26, 2011 from the Chinese Patent Office in the corresponding patent application No. 2009 1000 1712.4 with English translation.
Office action dated Apr. 3, 2009 in European Application No. 09 000 245.2.
Office action dated Nov. 17, 2009 in corresponding Japanese Application No. 2008-004853.

* cited by examiner

*Primary Examiner* — Philip Tucker
*Assistant Examiner* — William Bell
(74) *Attorney, Agent, or Firm* — Harness, Dickey & Pierce, PLC

(57) ABSTRACT

A first and second inner dies are combined to form a molding cavity, in which a fluidic material is charged and hardened for molding a tubular member, which has a side surface at least partially defining a projected portion being higher at one end than the other end. The first inner die forms an inner space of the tubular member. The second inner die forms the projected portion. A first actuating unit draws the first inner die from the other end along a first moving path, which is substantially linear along an axis of the tubular member. A second actuating unit draws the second inner die from the other end along a second moving path, which bulges toward the inner space and passes through the inner space.

6 Claims, 10 Drawing Sheets

US 8,052,417 B2

MOLDING APPARATUS AND METHOD FOR MOLDING

CROSS REFERENCE TO RELATED APPLICATIONS

This application is based on and incorporates herein by reference Japanese Patent Application No. 2008-4853 filed on Jan. 11, 2008.

FIELD OF THE INVENTION

The present invention relates to a molding apparatus for molding a product having a tubular member and a method for molding the product.

BACKGROUND OF THE INVENTION

In a molding process of a resin product, which has an undercut portion, a resin product needs to be removed from molding dies subsequent to opening the molding dies, without damaging the undercut portion. For example, JP-A6-114893 proposes molding dies including multiple dies around an undercut portion. The molding dies are configured to be opened when an undercut portion is removed from the molding dies.

FIG. 13 is a front view showing a molded product 2, which includes a tubular member 1, and one example of a moving path of an inner die 3 according to a prior art. According the prior art, an molding apparatus has an inner die 3 for forming the inner space of the tubular member 1 of the molded product 2. In a case where a molded product 2 does not have a large portion 5, and a tubular member 1 is trapezoid in cross section when taken along an axis of the molded product 2, an inner die 3 can be slid to the left side in FIG. 13 and drawn from an inner space of the tubular member 1 through an end 4, which has a large opening. However, in the structure shown in FIG. 13, a large portion 5 is integrated with the end 4 of the tubular member 1. That is, the molded product 2 has an undercut portion. Accordingly, the inner die 3 cannot be axially drawn from the inner space of the tubular member 1 from the end 4 to the right side in FIG. 13, as imaginarily shown in FIG. 13.

SUMMARY OF THE INVENTION

In view of the foregoing and other problems, it is an object of the present invention to produce a molding apparatus capable of efficiently molding a product, which has a tubular member as an undercut portion. It is another object of the present invention to produce a method for molding the product.

According to one aspect of the present invention, a molding apparatus comprises a first inner die and a second inner die configured to be combined to form a molding cavity for molding a molded product, which has a tubular member having a side surface at least partially defining a projected portion having one end and an other end in an axial direction, the one end being higher than the other end, the first inner die being configured to form an inner space of the tubular member, the second inner die being configured to form the projected portion. The molding apparatus further comprises a first actuating unit configured to draw the first inner die along a first moving path through the other end of the tubular member. The molding apparatus further comprises a second actuating unit configured to draw the second inner die along a second moving path through the other end of the tubular member. The first moving path is substantially linear along an axis of the tubular member. The second moving path bulges toward the inner space, which is formed by drawing the first inner die, and passes through the inner space.

Alternatively, according to another aspect of the present invention, a method for molding a molded product, which has a tubular member having a side surface at least partially defining a projected portion having one end and an other end in an axial direction, the one end being higher than the other end, the method comprises clamping a first inner die, which is for forming an inner space of the tubular member, and a second inner die, which is for forming the projected portion. The method further comprises charging a fluidic material into the molding cavity. The method further comprises hardening the fluidic material in the molding cavity. The method further comprises first drawing the first inner die along a first moving path through an other end of the tubular member. The method further comprises second drawing the second inner die along a second moving path through the other end of the tubular member. The first moving path is substantially linear along an axis of the tubular member. The second moving path bulges toward the inner space, which is formed by the first inner die, and passes through the inner space.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 2:
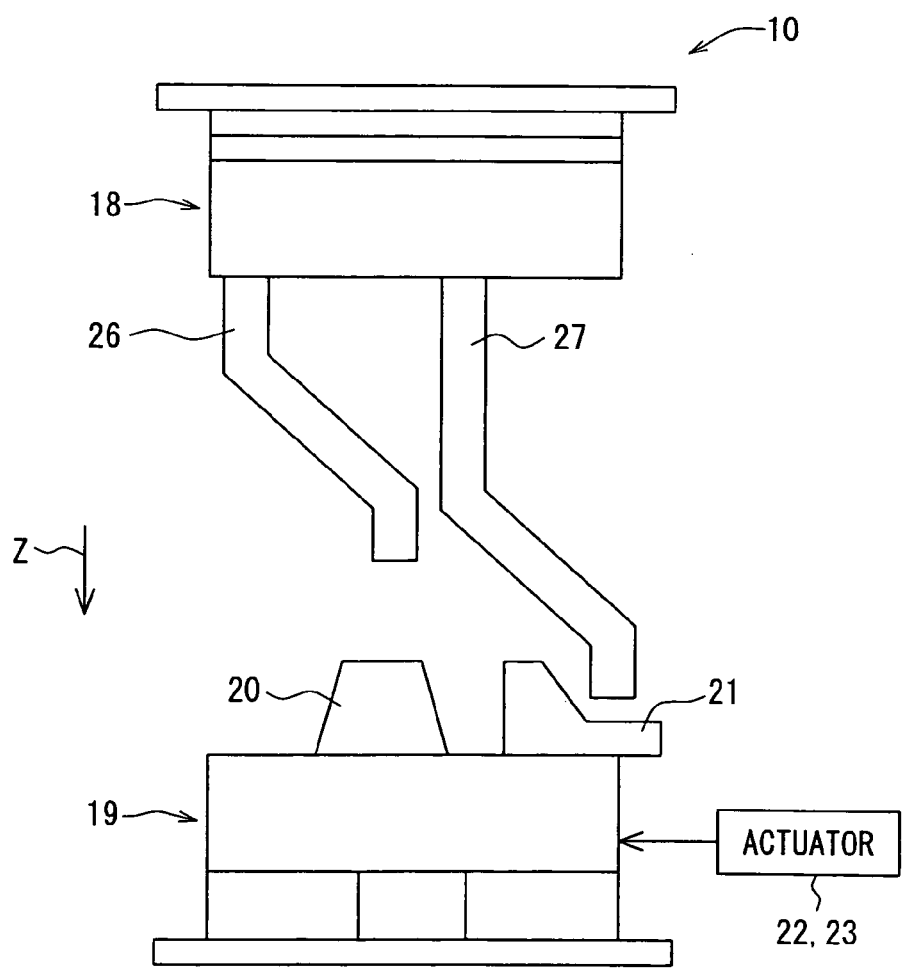
FIG. 2 is a schematic side view showing the molding apparatus in a molding-dies-opened condition.
Figure 3:
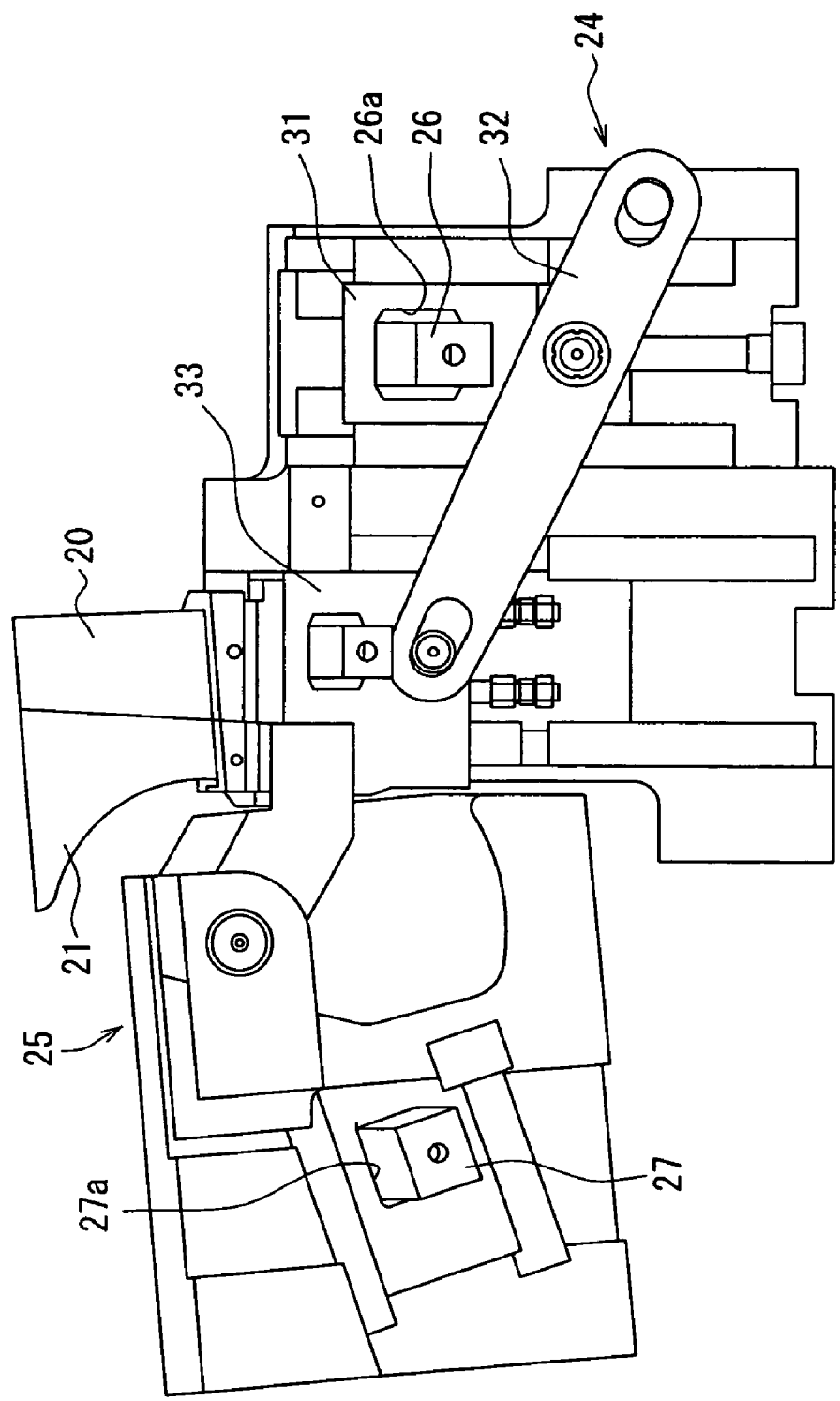
FIG. 3 is an enlarged top view showing a part of the molding apparatus.

The present first embodiment will be described with reference to FIGS. 1 to 12. As shown in FIGS. 1 to 5, a molding apparatus 10 is configured to mold a molded product 11, which includes a tubular member (tubular portion) 12. FIG. 3 shows a part of the molding apparatus around an inner die for forming the inner space of the tubular member 12 of the molded product 11. The molding apparatus 10 produces the molded product 11, which has the tubular member 12, by forming a molding cavity 13 among multiple dies, charging a fluidic material into the molding cavity 13, and hardening the fluidic material. According to the present embodiment, multiple dies are clamp to each other, and melting resin is charged into the molding cavity 13 defined by the clamped dies so as to form the molded product 11 from resin in the molding apparatus 10. Thus, the molding dies are opened and the molded product 11 is removed from the molding dies.

Figure 4:
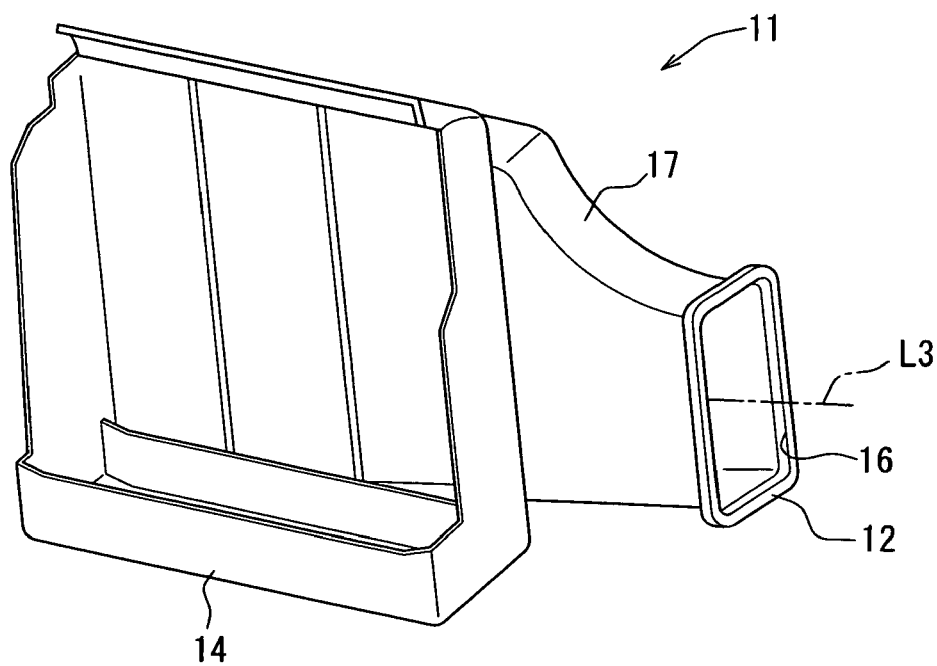
FIG. 4 is a perspective view showing a molded product when viewed from a front side.
Figure 5:
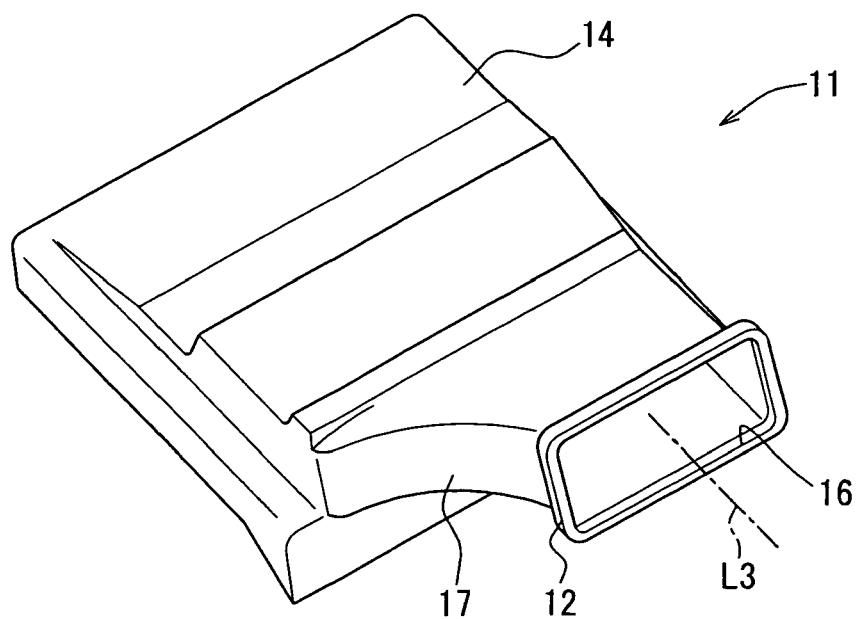
FIG. 5 is a perspective view showing the molded product when viewed from a rear side.

As shown in FIGS. 4, 5, the molded product 11 formed by the molding apparatus 10 includes the tubular member 12 and a body portion 14. The tubular member 12 has a sidewall, which is substantially uniform in thickness. The tubular member 12 has one axial end at the side of one opening 15 and the other axial end at the side of the other opening 16 in the axial direction. The sidewall of the tubular member 12 at least partially defines an inclined portion 17, which protrudes from the side of the other axial end of the tubular member 12. The inclined portion 17 is a projected portion and inclined from the one opening 15 at the one axial end toward an other opening 16 at the other axial end so as to be closer to the axis L3. According to the present embodiment, the inclined portion 17 is substantially in a curved shape such as an arc shape and bent from the one opening 15 at the one axial end toward the other opening 16 at the other axial end. In the present structure, the one opening 15 at the one end is larger than the other opening 16 at the other end in the tubular member 12. The tubular member 12 is substantially rectangle in cross section taken along one imaginary plane, which perpendicularly intersects with the axial direction. The one opening 15 of the tubular member 12 is connected with a body portion (other portion) 14. The body portion 14 is substantially in a rectangular shape and integrally provided with the tubular member 12, which protrudes from the sidewall of the body portion 14.

Next, the molding apparatus 10 will be described in detail. The molding apparatus 10 includes a stationary die 18, a moving die 19, a sub-sliding die 20, a main-sliding die 21, and an actuator 22, which functions as a driving mechanism. The stationary die 18 is one of the multiple dies and configured to form the molding cavity 13 with the moving die 19 so as to define the outline of the molded product 11. The stationary die 18 functions to form at least the side wall of the tubular member 12. The stationary die 18 is fixed to a predetermined stationary member such as a base member of the molding apparatus 10. The moving die 19 is an other of the multiple dies and configured to form the molding cavity 13 with the stationary die 18 so as to define the outline of the molded product 11. The moving die 19 functions to form at least the side wall of the tubular member 12. The moving die 19 is movable relative to the stationary die 18. The sub-sliding die 20 and the main-sliding die 21 function as inner dies so as to form the inner space of the tubular member 12. The two dies including the sub-sliding die 20 and the main-sliding die 21 define the shape of the inner wall of the tubular member 12, and thereby defining the inner space of the tubular member 12. The main-sliding die 21 defines the shape of the inclined portion 17 of the tubular member 12. The sub-sliding die 20 defines the shape of a remaining portion of the tubular member 12 other than the portion defined by the main-sliding die 21. In the present structure, the sub-sliding die 20 does not define the shape of the inclined portion 17 of the tubular member 12.

Figure 7A:
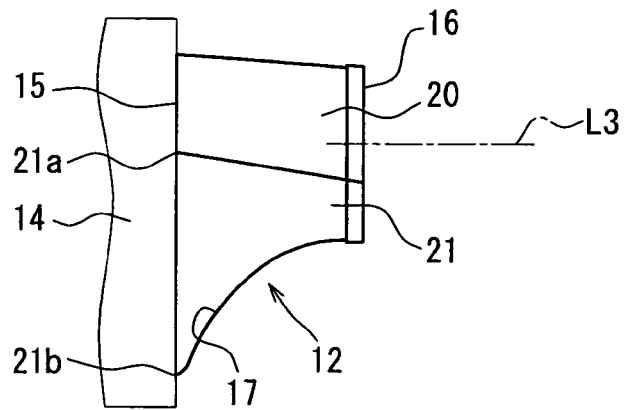
FIGS. 7A to 7C are top views each showing a sub-sliding die and a main-sliding die in the removing process.
Figure 7B:
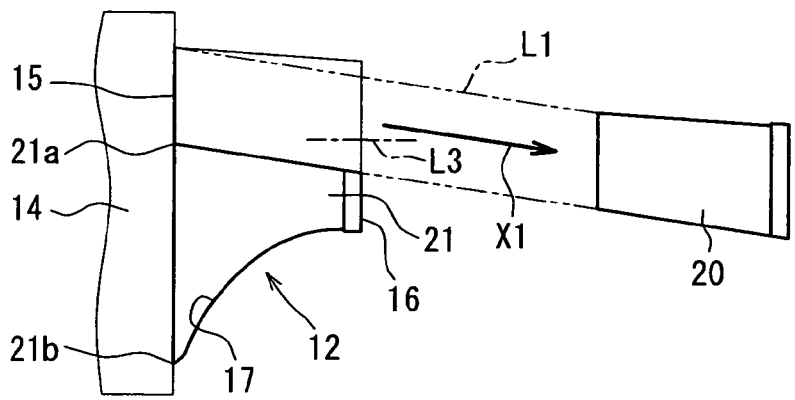
Figure 7C:
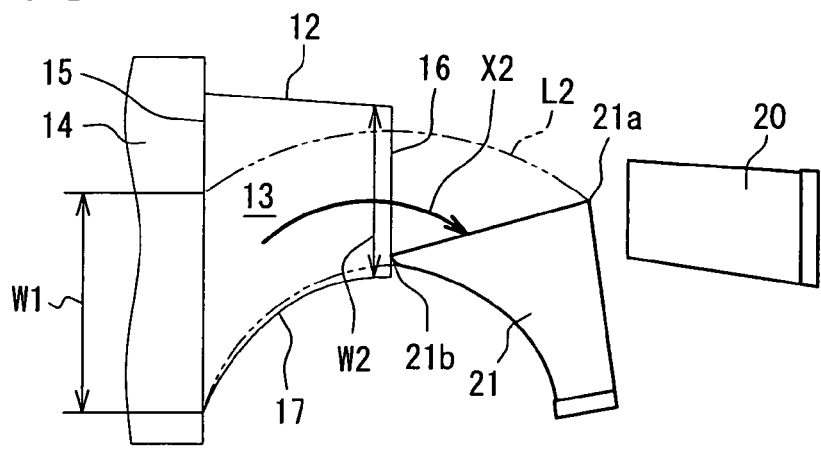

As shown in FIGS. 7A to 7C, the sub-sliding die 20 functions as a first inner die and configured to be drawn along a substantially linear drawing path (moving path) L1 along the axis L3 of the tubular member 12. That is, the sub-sliding die 20 can be drawn along the substantially linear moving path L1 directed from the one opening 15 toward the other opening 16 when the molding dies are clamped. As described above, the sub-sliding die 20 does not define the inclined portion 17 of the tubular member 12. Thereby, the sub-sliding die 20 is in a shape so as to be easily drawn along the substantially linear path without being moved in a complicated path. The sub-sliding die 20 is substantially in a rectangular parallelepiped shape. The sub-sliding die 20 enlarges from the one end at the side of the one opening 15 toward the other end at the side of the other opening 16. That is, the sub-sliding die 20 is divergent, i.e., tapered from the one opening 15 toward the other opening 16. Therefore, the sub-sliding die 20 can be drawn without being stuck on the inner wall of the tubular member 12. The main-sliding die 21 functions as a second inner die. A moving path L2 of the main-sliding die 21 is, for example, substantially in an arc-shape and bulges into the inner space, which is configured to accommodate the sub-sliding die 20. That is, the moving path L2 passes through the inner space, which is configured to accommodate the sub-sliding die 20. The main-sliding die 21 can be drawn along the substantially arc-shaped moving path L2 directed from the one opening 15 toward the other opening 16 when the molding dies are clamped. The moving path L2 of the main-sliding die 21 passes through the inner space, which is configured to accommodate the sub-sliding die 20. As described above, the main-sliding die 21 defines the inclined portion 17 of the tubular member 12. The inclined portion 17 defines an undercut portion of the molded product 11. In a case where the inclined portion 17 is drawn along a substantially linear path, the inclined portion 17 cannot be drawn from the other opening 16. The main-sliding die 21 cannot be drawn through the other opening 16 without passing through the inner space, which is configured to accommodate the sub-sliding die 20. In the present structure, the main-sliding die 21 is drawn along the substantially arc-shaped moving path L2 passing through the inner space. The main-sliding die 21 is in a shape such that one corner of a substantially rectangular parallelepiped object is removed to define a curved surface, which is convex toward the opposite corner on the diagonal line of the object. The curved surface of the main-sliding die 21 defines the shape of the inclined portion 17 of the tubular member 12. The main-sliding die 21 can be drawn without being stuck on the inclined portion 17 by drawing the main-sliding die 21 along the moving path L2, which is similar to the shape of the inner wall of the inclined portion 17.

Figure 8:
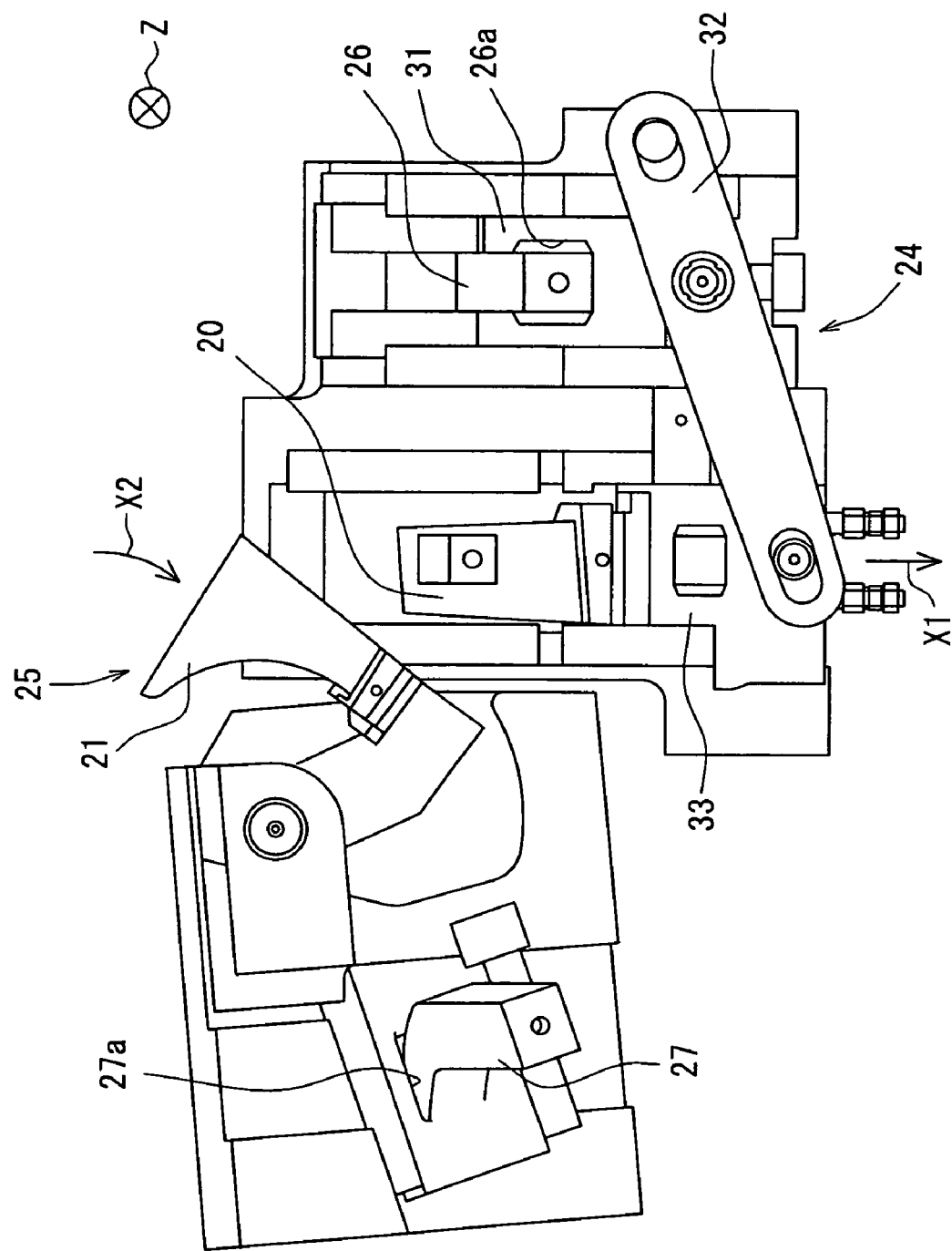
FIG. 8 is an enlarged top view showing the part of the molding apparatus in the removing process.
Figure 9:
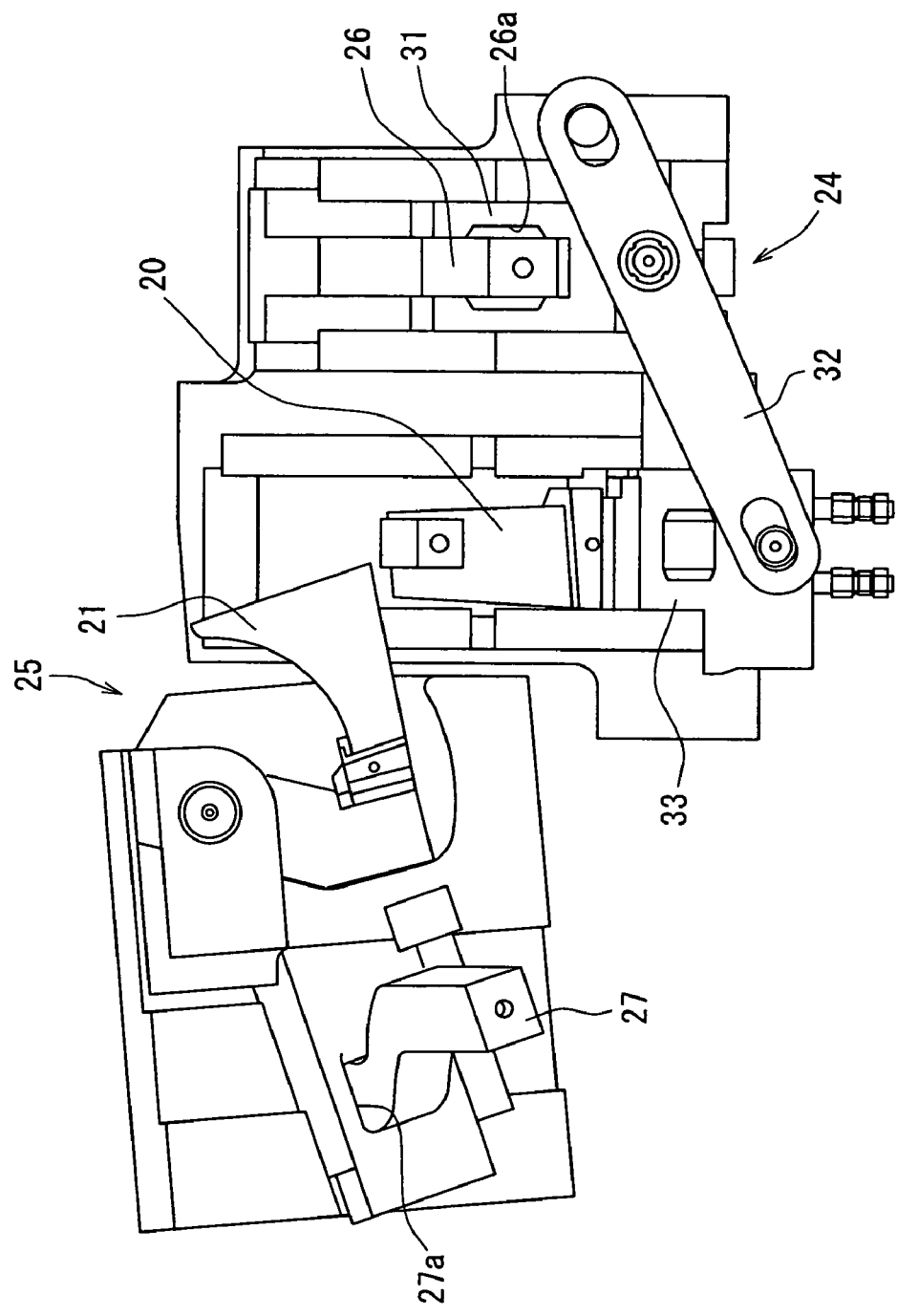
FIG. 9 is an enlarged top view showing the part of the molding apparatus in the removing process.

The main-sliding die 21 and the sub-sliding die 20 are in close contact with each other via surfaces opposed to each other when the molding dies are clamped. The sub-sliding die 20 urges the main-sliding die 21 toward the moving die 19 or the stationary die 18 when the molding dies are clamped. In the present structure, joining sections between the molding dies 18 to 21 can be protected from intrusion of melting resin when the molding dies are clamped. The actuator 22 is configured to move the moving die 19, the stationary die 18, the sub-sliding die 20, and the main-sliding die 21 relative to each other, and thereby causing a molding-dies-clamped condition and a molding-dies-opened condition. The actuator 22 is controlled by hydraulic pressure, for example. As shown in FIGS. 8 to 11, the actuator 22 includes a moving-die actuator portion 23, a sub-actuator portion 24, and a main-actuator portion 25. The moving-die actuator portion 23 functions as a third actuating unit for actuating the moving die 19 relative to the stationary die 18. As shown in FIG. 8, the moving-die actuator portion 23 actuates the moving die 19 in a die-opening direction Z, which intersects the axial direction of the tubular member 12, which is to be molded. The sub-actuator portion 24 functions as a first actuating unit. The sub-actuator portion 24 is configured to draw the sub-sliding die 20 through the other opening 16 of the tubular member 12 when the molding dies are 18-21 moved from each other and opened. The main-actuator portion 25 functions as a second actuating unit. The main-actuator portion 25 is configured to draw the main-sliding die 21 through the other opening 16 of the tubular member 12 subsequent to the drawing of the sub-sliding die 20.

Figure 1:
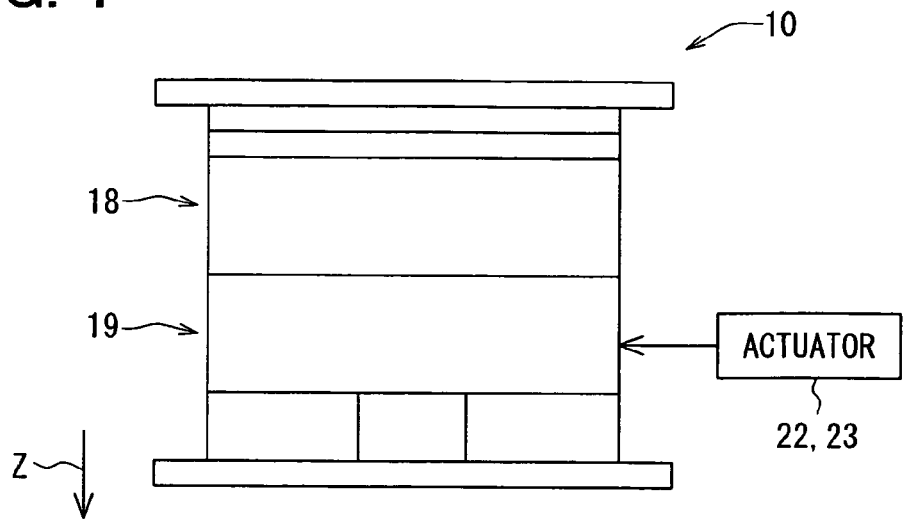
FIG. 1 is a schematic side view showing a molding apparatus in a molding-dies-clamped condition according to an embodiment.

As shown in FIG. 1, the stationary die 18 is provided with two sliding members including a sub-sliding member 26 and a main-sliding member 27. Each of the sliding members 26, 27 functions as a moving member. The sub-actuator portion 24 and the main-actuator portion 25 are actuated in conjunction with movement of the moving die 19. Therefore, each of the sliding members 26, 27 functions as a power transmission unit for transmitting output power of the moving-die actuator portion 23 to the sub-actuator portion 24 and the main-actuator portion 25. The sub-sliding member 26 is engaged with the sub-actuator portion 24. The moving die 19 is actuated in the die-opening direction Z, and thereby the sub-sliding member 26 displaces an engaged portion with the sub-actuator portion 24 so as to actuate the sub-actuator portion 24. The main-sliding member 27 is engaged with the main-actuator portion 25. The moving die 19 is actuated in the die-opening direction Z, and thereby the main-sliding member 27 displaces an engaged portion with the main-actuator portion 25 so as to actuate the main-actuator portion 25.

Figure 6:
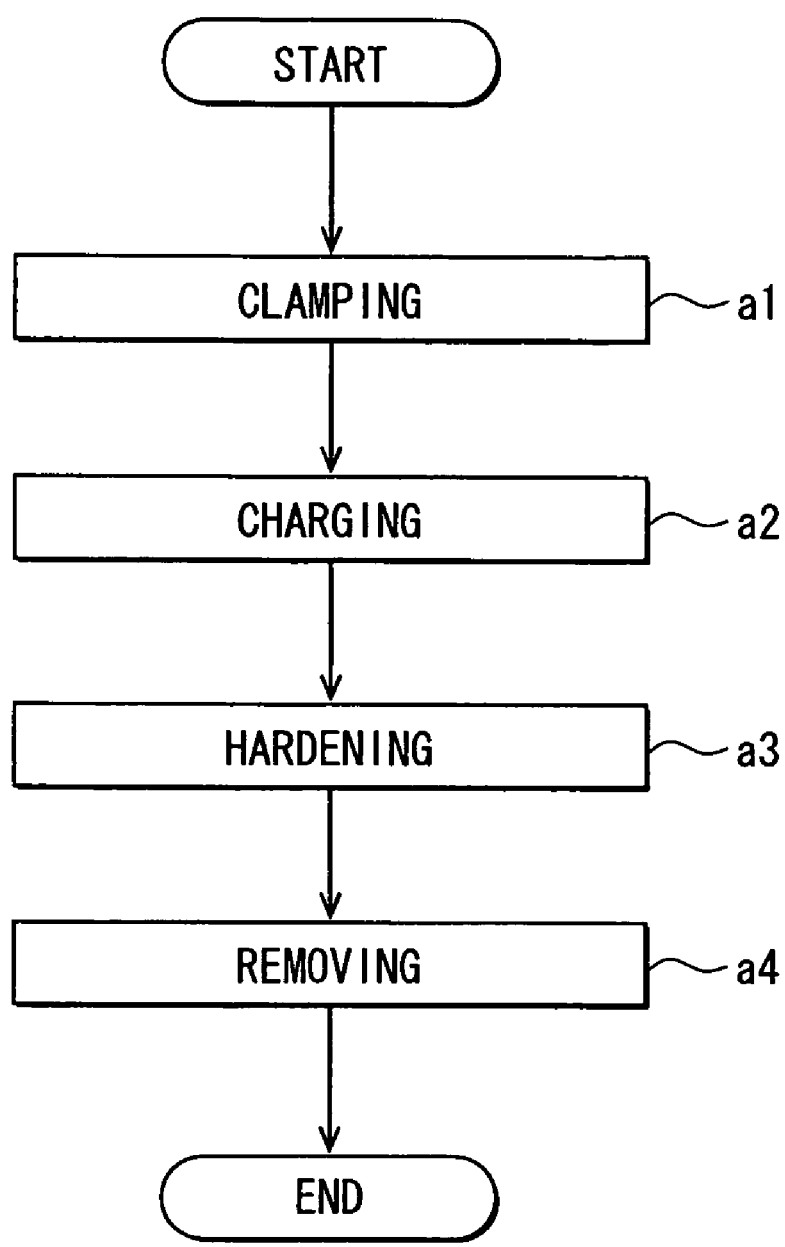
FIG. 6 is a flowchart showing a molding process.

Next, a method for molding the molded product with the molding apparatus 10 will be described in detail with reference to FIG. 6. When the processing of FIG. 6 is executed, the processing proceed with step a1. Step a1 corresponds to a clamping process for combining and clamping the stationary die 18, the moving die 19, the sub-sliding die 20, and the main-sliding die 21 so as to thereamong define the molding cavity 13. Subsequently, the processing proceeds to step a2. The molding cavity 13 is substantially the same as the molded product 11 in shape. Step a2 is a charging process for charging melting resin as a fluidic material into a molding cavity 13 by using an injection device, for example. Subsequently, the processing proceeds to step a3. Step a3 is a hardening process for hardening the charged melting resin. Subsequently, the processing proceeds to step a4. The hardening process may be carried out by, for example, holding the molding dies in a clamped condition for a predetermined period. Alternatively, for example, the molding dies around the molding cavity 13 may be cooled. The hardening process may be carried out with another method. Step a4 is a removing process for removing the molded product 11, which is hardened at step a3, from opened multiple dies 18-21. Thus, the present processing is terminated. Specifically, the moving-die actuator portion 23 actuates the moving die 19 in the die-opening direction Z so as to open the molding dies. As described above, the sub-sliding die 20 and the main-sliding die 21 are respectively actuated in drawing directions in conjunction with the movement of the moving die 19. Though the present processes, the molded product 11 having the tubular member 12 is molded.

Next, the removing process of step a4 will be described further in detail. The removing process includes a first drawing stage, which is for drawing the sub-sliding die 20, and a second drawing stage, which is for drawing the main-sliding die 21 subsequent to the first drawing stage. FIG. 7A shows the sub-sliding die 20 and the main-sliding die 21 in the molding-dies-clamped condition. The sub-sliding die 20 is initially in the molding-dies-clamped condition shown in FIGS. 3, 7A. On the first drawing stage, the sub-sliding die 20 is drawn from the other opening 16 of the tubular member 12 as shown in FIG. 7B. As described above, the moving path L1 of the sub-sliding die 20 is substantially linear and directed from the one opening 15 to the other opening 16. The sub-sliding die 20 is drawn in this manner, and thereby forming the inner space, in which the main-sliding die 21 can be moved.

As shown in FIGS. 7C, 8, on second drawing stage, the main-sliding die 21 is drawn from the other opening 16 of the tubular member 12. As described above, the moving path L2 of the main-sliding die 21 is substantially in a curved shape such as an arc shape directed from the one opening 15 to the other opening 16 so as to pass through the inner space formed by drawing the sub-sliding die 20. Specifically, the other end of the main-sliding die 21 at the side of the other opening 16 is first drawn along the arc-shaped moving path L2 through the other opening 16. Thereafter, one end 21a of the main-sliding die 21, which is located at the side of the one opening 15 and in contact with the sub-sliding die 20 when the sub-sliding die 20 is in the molding cavity, is drawn through the inner space, which is formed by drawing the sub-sliding die 20. In the present condition, the one end 21a configured to be in contact with the sub-sliding die 20 is drawn in advance of an other end 21b, which is located at the side of the other opening 16 and define the inclined portion 17. Thus, the main-sliding die 21 can be restricted from being stuck on the inner wall of the tubular member 12 by being drawn in this manner. The main-sliding die 21 has one side, which corresponds to the one opening 15 of the tubular member 12 when being in the molding-dies-clamped condition, and the one side of the main-sliding die 21 has the width W1. The other side of the other opening 16 of the tubular member 12 has the width W2. The width W1 is larger than the width W2. Even thought the main-sliding die 21 has such a shape, the main-sliding die 21 can be drawn from the other opening 16, since the one end 21a, which is configured to be in contact with the sub-sliding die 20, is drawn along the arc-shaped moving path L2 in advance of the other end 21b, which defines the inclined portion 17. In the molding-dies-opened condition shown in FIG. 9 subsequent to the second drawing stage, the main-sliding die 21 is removed from the molded product 11 and the molded product 11 is taken out.

Figure 10:
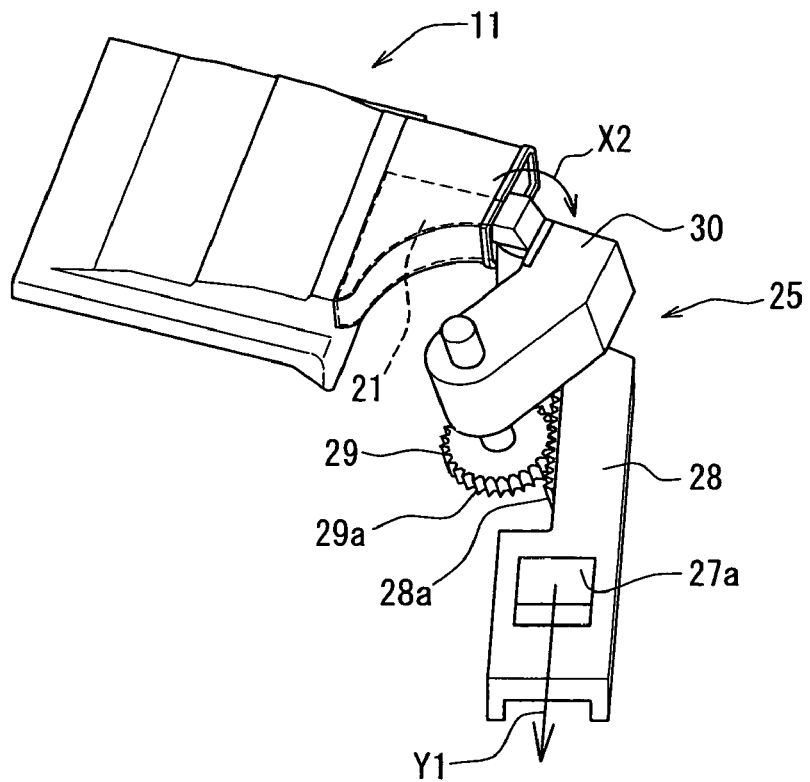
FIG. 10 is a schematic perspective view showing a main-actuator portion.

Next, the main-actuator portion 25, which actuates the main-sliding die 21, will be described in detail. As shown in FIGS. 2, 10, the main-sliding member 27 is engaged with an engaged portion 27a of the main-actuator portion 25, and the moving die 19 is actuated in the die-opening direction Z, thereby the main-actuator portion 25 draws the main-sliding die 21. The main-actuator portion 25 includes a rack part 28, a gear part 29, and a main-drawing part 30. The rack part 28 and the gear part 29 function as a speed-increasing mechanism configured to move the main-sliding die 21 by a larger distance than a distance of the movement of the engaged portion 27a between the main-actuator portion 25 and the main-sliding member 27. The rack part 28 has the engaged portion 27a, via which the main-sliding member 27 is engaged with the rack part 28. The rack part 28 has a rack 28a. The rack part 28 slides in a predetermined rack direction Y1 in response to movement of the main-sliding member 27. The gear part 29 has gears 29a, with which are meshed with the rack 28a. The gears 29a of the gear part 29 causes angular displacement of the gear part 29, i.e., rotates the gear part 29, in response to sliding of the rack part 28 in the rack direction Y1. The main-drawing part 30 is integrated with the gear part 29. The main-drawing part 30 causes an angular displacement in response to the angular displacement of the gear part 29. The main-drawing part 30 is integrated with the main-sliding die 21. In the present structure, the main-sliding die 21 causes the angular displacement, i.e., the main-sliding die 21 rotates in a drawing direction X2 around the rotation axis of the gears 29a in response to movement of the engaged portion 27a of the rack part 28 in the rack direction Y1. In addition, the main-sliding die 21 can be moved by the larger distance than the distance of the movement of the engaged portion 27a, i.e., the distance of the movement of the rack 28a, according to a gear ratio between the rack 28a and the gears 29a.

Figure 11:
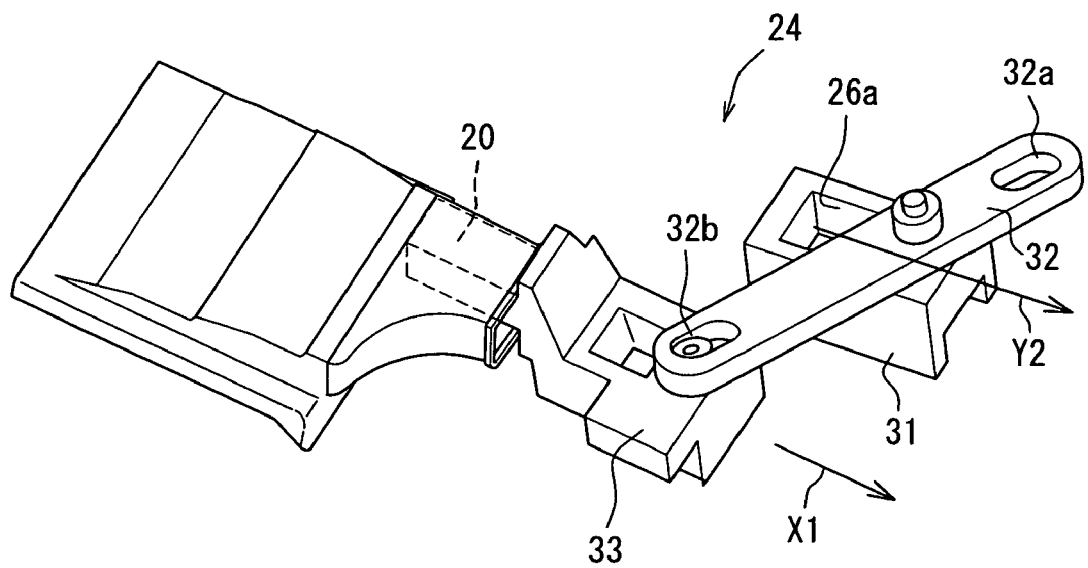
FIG. 11 is a schematic perspective view showing a sub-actuator portion.

Next, the sub-actuator portion 24, which actuates the sub-sliding die 20, will be described in detail. As shown in FIGS. 2, 11, the sub-sliding member 26 is engaged with an engaged portion 26a of the sub-actuator portion 24, and the moving die 19 is actuated in the die-opening direction Z, thereby the sub-actuator portion 24 draws the sub-sliding die 20. The sub-actuator portion 24 includes an action part 31, a lever part 32, and a sub-drawing part 33. The lever part 32 and the action part 31 function as a speed-increasing mechanism configured to move the sub-sliding die 20 by a larger distance than a distance of the movement of the engaged portion 26a between the sub-actuator portion 24 and the sub-sliding member 26. The sub-drawing part 33 is integrated with the sub-sliding die 20. The action part 31 has the engaged portion 26a, via which the action part 31 is engaged with the sub-sliding member 26. The action part 31 slides in a predetermined action direction Y2 in response to movement of the sub-sliding member 26. The action part 31 supports an intermediate portion of the lever part 32 in the longitudinal direction so as to cause the angular displacement. That is, the lever part 32 is rotatable on the action part 31. The lever part 32 has one end 32a and an other end 32b in the longitudinal direction. The one end 32a is located at a fixed point, and the other end 32b is slidable and rotatable relative to the sub-drawing part 33. In the present structure, the lever part 32 causes an angular displacement around the one end 32a in response to movement of the action part 31 in the action direction Y2. The sub-drawing part 33 slides the sub-sliding die 20, which is integrated with the sub-drawing part 33, in the drawing direction X1 in response to the angular displacement of the lever part 32 around the one end 32a. The sub-sliding die 20 can be moved by the larger distance than the distance of the movement of the engaged portion 26a, i.e., the distance of the movement of the action part 31, according to the length of the lever part 32.

Next, the sub-sliding member 26 will be described in detail. The structure of the sub-sliding member 26 is similar to the structure of the main-sliding member 27. Therefore the structure of the sub-sliding member 26 will described, and a description of the main-sliding member 27 is omitted.

Figure 12A:
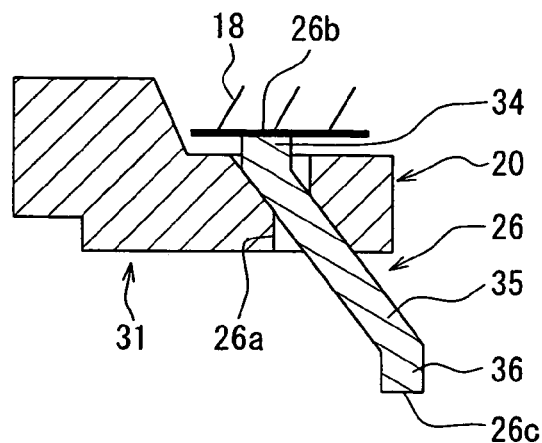
FIGS. 12A to 12C are schematic sectional views each showing a sub-sliding member and an action part, which are being moved.
Figure 12B:
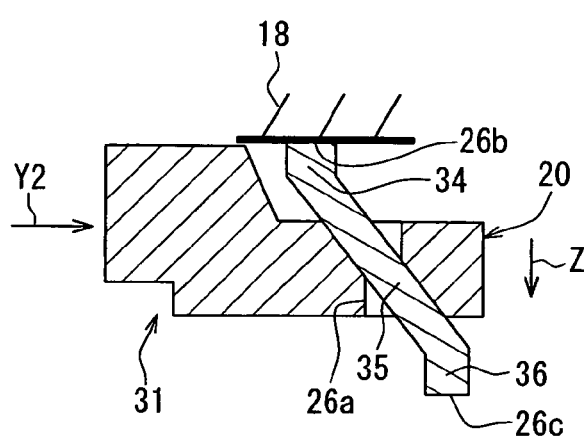
Figure 12C:
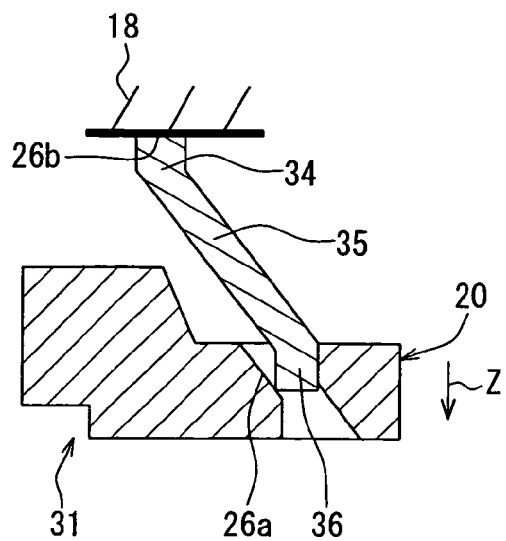
Figure 13:
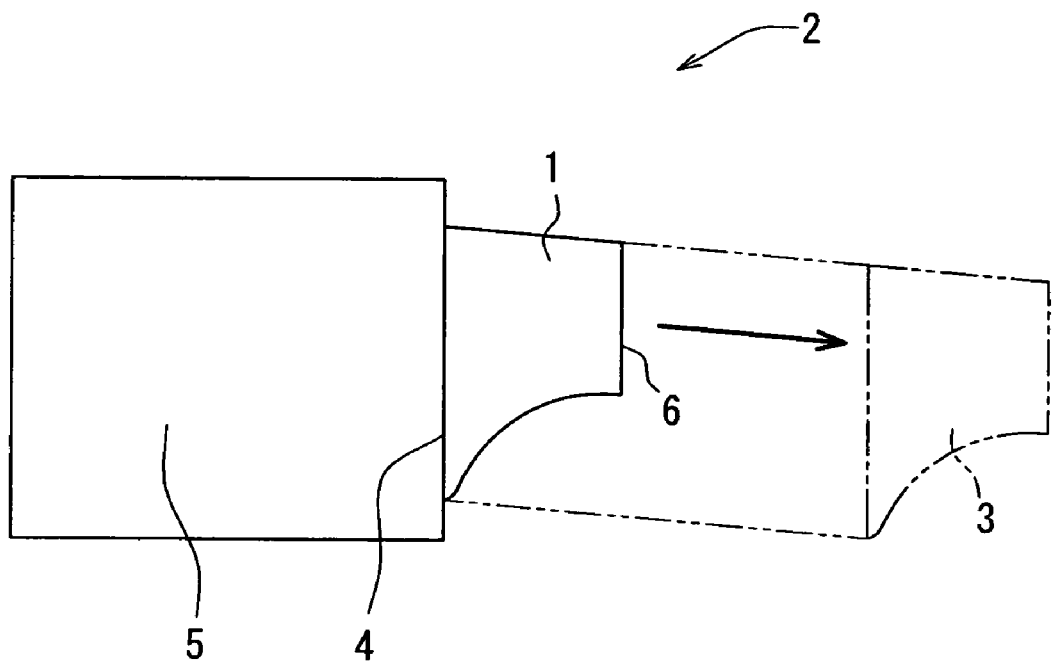
FIG. 13 is a schematic top view showing a molded product including a tubular member and one example of a moving path of an inner die according to a prior art.

As shown in FIGS. 12A to 12C, the sub-sliding member 26 lengthwise extends and has a base end 26b, which is fixed to the stationary die 18. The sub-sliding member 26 includes a first sliding member 34, an inclined portion 35, and a second sliding member 36, which are integrated with each other and arranged in this order from the base end 26b to a tip end 26c. The first sliding member 34 extends from the stationary die 18 in the die-opening direction Z. The first sliding member 34 has an end in the die-opening direction Z, and the end is connected with one end of the inclined portion 35. The inclined portion 35 is extended and inclined with respect to the die-opening direction Z. The inclined portion 35 has an end in the die-opening direction Z, and the end is connected with one end of the second sliding member 36. The second sliding member 36 extends in the die-opening direction Z from the one end. The engaged portion 26a of the action part 31 is a through hole extending in the die-opening direction Z. The inner surface defining the engaged portion 26a is inclined and in contact with the inclined portion 35. In the present structure, in response to movement of the action part 31 and the moving die 19 in the die-opening direction Z, the engaged portion 26a of the action part 31 moves in the action direction Y2 while being guided by the inclined portion 35. The action part 31 moves by a distance in the action direction Y2 according to the inclination angle and the length of the inclined portion 35. The action part 31 starts moving in the action direction Y2 at a timing in dependence upon the length of the first sliding member 34. The connecting portion between the first sliding member 34 and the inclined portion 35 and the connecting portion between the inclined portion 35 and the second sliding member 36 are desirably chamfered respectively to define round surfaces. In the present structure, impact applied to the main-sliding member 27 can be reduced when the engaged portion 26a, which is in contact with the first sliding member 34, makes contact with the inclined portion 35 while the dies are opened.

In the molding-dies-clamped condition as shown in FIG. 12A, the base end 26b of the sub-sliding member 26 is most close to the action part 31. As the moving die 19 moves in the die-opening direction Z from the molding-dies-clamped condition shown in FIG. 12A, the action part 31 also moves in the die-opening direction Z. Simultaneously, as shown in FIG. 12B, the engaged portion 26a moves in the action direction Y2 along the inclined surface of the inclined portion 35. As the moving die 19 further moves in the die-opening direction Z from the condition shown in FIG. 12B, the engaged portion 26a, which is engaged with the inclined portion 35, makes contact with the second sliding member 36, thereby being engaged with the second sliding member 36. Thus, the moving die 19 stops moving in the action direction Y2. The action part 31 moves in the action direction Y2 in response to the movement of the moving die 19 in the die-opening direction Z, and thereby actuates the sub-sliding die 20 in the drawing direction X1.

As described above, according to the present embodiment, the molding apparatus 10 includes the sub-sliding die 20 and the main-sliding die 21 as the inner dies for defining the inner space of the tubular member 12. The sub-sliding die 20 can be drawn along the substantially linearly moving path L1 through the other opening 16 of the tubular member 12 without being stuck on the inner wall of the tubular member 12, since the multiple inner dies 20, 21 define the inner space. When the main-sliding die 21 is drawn along the substantially linear moving path L1, the main-sliding die 21 may be stuck on the inner wall of the tubular member 12 and cannot be removed. On the contrary, in the present embodiment, the main-sliding die 21 is drawn along the arc-shaped moving path L2, which passes through the inner space, in which the sub-sliding die 20 was accommodated. In the present structure, the main-sliding die 21 can be drawn along the arc-shaped moving path L2 without being stuck on the inner wall of the tubular member 12. Thus, the sub-sliding die 20 and the main-sliding die 21 need not be moved along complicated paths. That is, complicated operations need not be conducted for drawing the sub-sliding die 20 and the main-sliding die 21. Therefore, the molded product 11, which has the tubular member 12 and is in a complicated shape, can be efficiently molded.

Further, according to the present embodiment, the main-sliding member 27 and the sub-sliding member 26 respectively move the engaged portions 26a, 27a in response to the movement of the moving die 19 in the die-opening direction Z. Thereby, the main-sliding member 27 and the sub-sliding member 26 actuate the main-actuator portion 25 and the sub-actuator portion 24. Therefore, as the moving die 19 is moved in the die-opening direction Z, the main-actuator portion 25 and the sub-actuator portion 24 can be actuated in conjunction with the movement of the moving die 19. In the present structure, both the sub-sliding die 20 and the main-sliding die 21 can be drawn by actuating the moving die 19 in the die-opening direction Z. Therefore, a driving source for actuating the moving die 19 can be commonly used for actuating the main-actuator portion 25 and the sub-actuator portion 24, and thereby an additional driving source only for actuating the main-actuator portion 25 and the sub-actuator portion 24 need not be provided. Thus, the structure of the molding apparatus 10 can be simplified.

In addition, the main-sliding die 21 and the sub-sliding die 20 can be drawn simultaneously with moving of the moving die 19 in the die-opening direction Z. Therefore, in the present structure, a time period needed for opening the main-sliding die 21 and drawing both the sub-sliding die 20 and the moving die 19 can be reduced, compared with a structure in which the main-sliding die 21 and the sub-sliding die 20 are drawn subsequent to completion of the opening of the moving die 19 in the die-opening direction Z. Thus, productivity of the molding apparatus 10 can be enhanced.

Furthermore, according to the present embodiment, the rack part 28, the gear part 29, the action part 31, and the lever part 32 function as the speed-increasing mechanisms. Therefore, the sub-sliding die 20 and the main-sliding die 21 can be drawn within a short time period. Thus, a cycle time for forming each molded product by using the molding apparatus 10 can be reduced, and thereby productivity can be enhanced.

According to the present embodiment, the molding process of the molding apparatus 10 includes the removing process having the two drawing stages. In the first drawing stage, the sub-sliding die 20 can be drawn along the substantially linearly moving path L1 through the other opening 16 of the tubular member 12 without being stuck on the inner wall of the tubular member 12. In the second drawing stage, the main-sliding die 21 is drawn along the arc-shaped moving path L2, which passes through the inner space, in which the sub-sliding die 20 was accommodated. In the present structure, the main-sliding die 21 can be drawn along the arc-shaped moving path L2 without being stuck on the inner wall of the tubular member 12. Thus, the molded product 11 having the tubular member 12 can be molded with a simple molding process.

Other Embodiments

According to the above embodiment, the projected portion of the tubular member 12 is the substantially arc-shaped inclined portion 17. Alternatively, the projected portion may be substantially in a stair shape. That is, projected portion may protrude stepwise. The tubular member 12 may include multiple projected portions. According to the above embodiment, the molded product 11 includes the tubular member 12 and the body portion 14. Alternatively, the body portion 14 may be omitted from the molded product 11, and the molded product 11 may include only the tubular member 12. According to the above embodiment, the one opening 15 of the tubular member 12 entirely communicates with the exterior. Alternatively, the tubular member 12 may be partially or entirely bottomed, and the one end of the tubular member 12 may be partially or entirely closed. Similarly, the other opening 16 may be partially closed, as long as the other opening 16 has an opening area sufficient to draw the multiple inner dies successively through the other opening 16.

According to the above embodiment, the inner dies include two pieces including the main-sliding die 21 and the sub-sliding die 20. Alternatively, the inner dies may include three or more pieces. Even in the case where the inner dies include three or more pieces, at least a piece of the inner dies, which is finally drawn, passes along, for example, the arc-shaped moving path L2 through a remaining inner space, which accommodated another of the inner dies.

According to the above embodiment, the moving path L2 of the main-sliding die 21 is substantially in the curved shape such as the arc shape. The substantially arc shape is an example of the shape of the moving path L2. The substantially curved shape includes, for example, a segment of an ellipse, a quadratic curve, and the like. The shape of the moving path L2 is not limited to the above examples.

According to the above embodiment, the molding cavity 13 is defined with the four dies. Alternatively, the molding cavity 13 may be defined with five or more dies.

According to the above embodiment, the fluidic material charged in the charging process is melting resin. Nevertheless, it suffices that the fluidic material can be hardened and may be another material than the melting resin.

According to the above embodiment, both the sub-actuator portion 24 and the main-actuator portion 25 are actuated in conjunction with the movement of the moving-die actuator portion 23. Alternatively, both the sub-actuator portion 24 and the main-actuator portion 25 may be actuated with one driving source separately from another driving source of the moving-die actuator portion 23. Each of the sub-actuator portion 24, the main-actuator portion 25, and the moving-die actuator portion 23 may be individually actuated with each driving source.

Summarizing the above embodiment, the molding apparatus 10 is configured to combine the plurality of dies to form the molding cavity 13, charge the fluidic material into the molding cavity 13, and harden the fluidic material for molding the molded product 11. The molded product 11 has the tubular member 12 having the side surface at least partially defining the projected portion 17 having one end 15 and the other end 16 in the axial direction. The one end 15 protrudes higher than the other end 16. The molding apparatus 10 includes the first inner die 20 included in the plurality of dies and configured to form the inner space of the tubular member 12. The molding apparatus 10 further includes the second inner die 21 included in the plurality of dies and configured to form the projected portion 17. The molding apparatus 10 further includes the first actuating unit 24 configured to draw the first inner die 20 from the other end 16 of the tubular member 12 when the dies are opened subsequent to hardening of the fluidic material. The molding apparatus 10 further includes the second actuating unit 25 configured to draw the second inner die 21 from the other end 16 of the tubular member 12 when the dies are opened subsequent to drawing of the first inner die 20. The first inner die 20 is movable along the first moving path L1 in the inner space. The first moving path L1 is substantially linear along the axis of the tubular member 12. The second inner die 21 is movable along the second moving path L2 in the inner space. The second moving path L2 bulges toward the inner space, where the first inner die 20 was located, and passes through the inner space where the first inner die 20 was located.

Alternatively, summarizing the above embodiment, the molded product 11, has the tubular member 12 having the side surface at least partially defining the projected portion 17 having one end 15 and the other end 16 in the axial direction.

The one end 15 protrudes higher than the other end 16. The molded product 11 is formed by combining the plurality of dies to form the molding cavity 13, charging the fluidic material into the molding cavity 13, and hardening the fluidic material. The method includes the clamping process for combining and clamping the multiple dies including the first inner die 20, which is for forming the inner space of the tubular member 12, and the second inner die 21, which is for forming the projected portion 17. The method further includes the charging process for charging the fluidic material into the molding cavity 13. The method further includes the hardening process for hardening the fluidic material. The method further includes the removing process for opening the plurality of dies and removing the molded product, which is hardened in the hardening process. The removing process includes the first drawing stage for drawing the first inner die 20 from the other end 16 of the tubular member 12 when the dies are opened subsequent to hardening of the fluidic material. The removing process further includes the second drawing stage for drawing the second inner die 21 from the other end 16 of the tubular member 12 subsequent to drawing of the first inner die 20 in the first drawing stage. The first inner die 20 is movable along the first moving path L1 in the inner space. The first moving path L1 is substantially linear along the axis of the tubular member 12. The second inner die 21 is movable along the second moving path L2 in the inner space. The second moving path L2 bulges toward the inner space, in which the first inner die 20 was located, and passes through the inner space, in which the first inner die 20 was located.

The one end 15 may be greater than the other end 16 in cross section in the axial direction.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

The above structures of the embodiments can be combined as appropriate. Various modifications and alternations may be diversely made to the above embodiments without departing from the spirit of the present invention.

What is claimed is:

1. A molding apparatus comprising:
a first inner die and a second inner die configured to be combined to form a molding cavity for molding a molded product, which has a tubular member having a side surface at least partially defining a projected portion having one end and an other end in an axial direction, the one end being higher than the other end, the first inner die being configured to form an inner space of the tubular member, the second inner die being configured to form the projected portion;
a first actuating unit configured to draw the first inner die along a first moving path through the other end of the tubular member;
a second actuating unit configured to draw the second inner die along a second moving path through the other end of the tubular member,
a stationary die configured to form the side surface of the tubular member;
a moving die movable relative to the stationary-die and configured to form the side surface of the tubular member;
a third actuating unit configured to actuate the moving die in a die-opening direction, which intersects with a drawing direction in which the first inner die is drawn; and
a moving member provided to the stationary die,
wherein the first moving path is substantially linear along an axis of the tubular member,
the second moving path bulges toward the inner space, which is formed by drawing the first inner die, and passes through the inner space,
the moving member has an engaged portion configured to be engaged with the first actuating unit and the second actuating unit, and
the moving member is configured to actuate the first actuating unit and the second actuating unit by actuating the engaged portion in response to movement of the moving die in the die-opening direction.

2. The molding apparatus according to claim 1,
wherein the first actuating unit and the second actuating unit include a speed-increasing mechanism configured to be engaged with the moving member, and
the speed-increasing mechanism is configured to actuate the first inner die and the second inner die by a larger distance than a distance of the movement of the engaged portion.

3. The molding apparatus according to claim 1 wherein the one end is greater in cross-sectional area than the other end in the axial direction.

4. The molding apparatus according to claim 1 wherein the one end is projected to be higher than the other end in a direction perpendicular to the axial direction.

5. The molding apparatus according to claim 1 wherein the second moving path is substantially in a curved shape directed from the one end to the other end so as to pass through the inner space formed by drawing the first inner die.

6. The molding apparatus according to claim 5 wherein the second moving path is substantially in an arc shape.

* * * * *